(12) United States Patent
Weiss et al.

(10) Patent No.: US 7,882,039 B2
(45) Date of Patent: Feb. 1, 2011

(54) SYSTEM AND METHOD OF ADAPTIVE PERSONALIZATION OF SEARCH RESULTS FOR ONLINE DATING SERVICES

(75) Inventors: Aaron Frederick Weiss, Sunnyval, CA (US); Wei Wang, Atherton, CA (US); Egon Smola, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 905 days.

(21) Appl. No.: 11/191,389

(22) Filed: Jul. 28, 2005

(65) Prior Publication Data

US 2006/0059147 A1      Mar. 16, 2006

Related U.S. Application Data

(60) Provisional application No. 60/610,125, filed on Sep. 15, 2004.

(51) Int. Cl.
  *G06Q 10/00* (2006.01)
  *G06Q 99/00* (2006.01)
  *G06F 7/00* (2006.01)
  *G06F 17/30* (2006.01)

(52) U.S. Cl. .................. 705/319; 705/1.1; 707/705; 707/721; 707/722; 707/723; 707/732

(58) Field of Classification Search ............... 705/1
See application file for complete search history.

(56) References Cited

U.S. PATENT DOCUMENTS

| | | |
|---|---|---|
| 5,086,394 A | 2/1992 | Shapira |
| 5,950,193 A | 9/1999 | Kulkarni |
| 5,950,200 A | 9/1999 | Sudai et al. |

(Continued)

FOREIGN PATENT DOCUMENTS

CA      2 455 342 A1      6/2004

(Continued)

OTHER PUBLICATIONS

Jason Ethier "Current Research in Social Network Theory", 10pp., Available at http://www.ccs.neu.edu/home/perrolle/archive/Ethier-SocialNetworks.html.

(Continued)

*Primary Examiner*—Jamisue A Plucinski
*Assistant Examiner*—Shaun Sensenig
(74) *Attorney, Agent, or Firm*—Frommer Lawrence & Haug LPP; Jamie L. Wiegand

(57) ABSTRACT

A system and method are directed towards automatically modifying an online dating service's search results based on adaptive personalizations from a user's activities. A user provides input to questions that seek information regarding the user. The invention employs the input to identify a list of candidates for a potential long-term social relationship with the user. The invention may then develop a unified search score for each candidate that represents a weighted sum of normalized search subscores. The subscores represent various user activities, affinities with a candidate, frequencies of viewing a candidate profile, and feedback about a candidate from the user. The unified search score for each candidate is then used to rank order the results presented to the user.

22 Claims, 3 Drawing Sheets

U.S. PATENT DOCUMENTS

| | | | |
|---|---|---|---|
| 5,963,951 A | 10/1999 | Collins | |
| 5,996,006 A | 11/1999 | Speicher | |
| 6,064,967 A | 5/2000 | Speicher | |
| 6,175,831 B1 | 1/2001 | Weinreich et al. | |
| 6,243,375 B1 | 6/2001 | Speicher | |
| 6,269,369 B1 | 7/2001 | Robertson | |
| 6,272,467 B1* | 8/2001 | Durand et al. | 705/1 |
| 6,282,515 B1 | 8/2001 | Speicher | |
| 6,285,984 B1 | 9/2001 | Speicher | |
| 6,327,573 B1 | 12/2001 | Walker et al. | |
| 6,356,879 B2 | 3/2002 | Aggarwal et al. | |
| 6,385,620 B1 | 5/2002 | Kurzius et al. | |
| 6,433,795 B1 | 8/2002 | MacNaughton et al. | |
| 6,466,917 B1 | 10/2002 | Goyal et al. | |
| 6,473,751 B1 | 10/2002 | Nikolovska et al. | |
| 6,480,885 B1 | 11/2002 | Olivier | |
| 6,502,077 B1 | 12/2002 | Speicher | |
| 6,640,230 B1 | 10/2003 | Alexander et al. | |
| 6,665,389 B1 | 12/2003 | Haste, III | |
| 6,697,786 B2 | 2/2004 | Speicher | |
| 6,735,568 B1 | 5/2004 | Buckwalter et al. | |
| 6,742,002 B2 | 5/2004 | Arrowood | |
| 6,745,178 B1 | 6/2004 | Emens et al. | |
| 6,836,762 B2 | 12/2004 | Speicher | |
| 7,069,308 B2 | 6/2006 | Abrams | |
| 7,246,067 B2 | 7/2007 | Austin et al. | |
| 7,363,246 B1 | 4/2008 | Van Horn et al. | |
| 2002/0023230 A1 | 2/2002 | Bolnick et al. | |
| 2002/0040310 A1* | 4/2002 | Lieben et al. | 705/7 |
| 2002/0059204 A1 | 5/2002 | Harris | |
| 2002/0073079 A1 | 6/2002 | Terheggen | |
| 2002/0091768 A1 | 7/2002 | Balasubramanian | |
| 2002/0116458 A1 | 8/2002 | Bricklin et al. | |
| 2002/0116466 A1 | 8/2002 | Trevithick et al. | |
| 2002/0124053 A1 | 9/2002 | Adams et al. | |
| 2002/0178163 A1 | 11/2002 | Mayer | |
| 2002/0188636 A1 | 12/2002 | Peck et al. | |
| 2003/0050977 A1* | 3/2003 | Puthenkulam et al. | 709/204 |
| 2003/0071852 A1 | 4/2003 | Stimac | |
| 2003/0093405 A1 | 5/2003 | Mayer | |
| 2003/0117436 A1 | 6/2003 | Kautto-Koivula et al. | |
| 2003/0167324 A1 | 9/2003 | Farnham et al. | |
| 2003/0191673 A1* | 10/2003 | Cohen | 705/5 |
| 2003/0200217 A1 | 10/2003 | Ackerman | |
| 2004/0010484 A1 | 1/2004 | Foulger et al. | |
| 2004/0031058 A1 | 2/2004 | Reisman | |
| 2004/0080534 A1 | 4/2004 | Quach | |
| 2004/0088315 A1 | 5/2004 | Elder et al. | |
| 2004/0088322 A1 | 5/2004 | Elder et al. | |
| 2004/0088325 A1 | 5/2004 | Elder et al. | |
| 2004/0122681 A1 | 6/2004 | Ruvolo et al. | |
| 2004/0122803 A1* | 6/2004 | Dom et al. | 707/3 |
| 2004/0122810 A1 | 6/2004 | Mayer | |
| 2004/0122855 A1 | 6/2004 | Ruvolo et al. | |
| 2004/0167794 A1 | 8/2004 | Shostack et al. | |
| 2004/0210661 A1 | 10/2004 | Thompson | |
| 2004/0215793 A1 | 10/2004 | Ryan et al. | |
| 2004/0260781 A1 | 12/2004 | Shostack et al. | |
| 2005/0004837 A1 | 1/2005 | Sweeney et al. | |
| 2005/0055231 A1 | 3/2005 | Lee | |
| 2005/0076003 A1 | 4/2005 | DuBose et al. | |
| 2005/0197846 A1 | 9/2005 | Pezaris et al. | |
| 2006/0031121 A1 | 2/2006 | Speicher | |
| 2006/0106780 A1 | 5/2006 | Dagan | |
| 2006/0287928 A1 | 12/2006 | Terrill et al. | |
| 2007/0073687 A1 | 3/2007 | Terrill et al. | |
| 2007/0073802 A1 | 3/2007 | Terrill et al. | |
| 2008/0059576 A1 | 3/2008 | Liu et al. | |
| 2009/0164464 A1 | 6/2009 | Carrico et al. | |

FOREIGN PATENT DOCUMENTS

| | | |
|---|---|---|
| JP | 06019926 A | 1/1994 |
| JP | 2003015992 A | 1/2003 |

OTHER PUBLICATIONS

Frequently Asked Questions, 29 pp., Available at http://www.zerodegrees.com/help.html.

Richard V. Dragan, "Tribe.net (beta)," PC Magazine, Jan. 20, 2004, 2pp. Available at http//:www.pcmag.com/article2/0,1759,1418688,00.asp.

Timothy J. Mullaney, "Diller's Latest Little Bet on the Net", BusinessWeek Online, Mar. 1, 2004, 3 pp., Available at http://www.businessweek.com/technology/content/mar2004/tc20004031_2820_tc119.htm.

International Search Report and Written Opinion for PCT/US05/31142, mailed Oct. 24, 2006 (5 pages).

Notification of Transmittal of The International Search Report and the Written Opinion of the International Searching Authority, or the Declaration (11 pages).

MetricStream, Enterprise Quality and Compliance Management Solutions, "Zaplet Technology within MetricStream" visited on Sep. 16, 2005, <www.metricstream.com/products/zap_tec_ms.htm>.

Gmail, "About Gmail," visited on Sep. 16, 2005, <http://mail.google.com/mail/help/about.html>.

True U, "Using True," visited on Sep. 16, 2005, <www.true.com/magazine/true_coach_summertips_part9.htm>.

AmericanSingles.com, "Learn More About AmericanSingles.com," visited on Sep. 16, 2005, <www.americansingles.com/default.asp?p=13010&CategoryID=62>.

U.S. Appl. No. 11/220,002, Official Communication mailed May 15, 2008.

U.S. Appl. No. 11/012,543, Official Communication mailed Jul. 10, 2008.

U.S. Appl. No. 11/218,904, Official Communication mailed Apr. 18, 2006.

U.S. Appl. No. 11/218,904, Official Communication mailed Sep. 19, 2006.

U.S. Appl. No. 11/218,904, Official Communication mailed Jan. 16, 2007.

U.S. Appl. No. 11/218,904, Official Communication mailed Jun. 29, 2007.

U.S. Appl. No. 11/012,543, Official Communication mailed Feb. 26, 2007.

U.S. Appl. No. 11/012,543, Official Communication mailed Aug. 8, 2007.

Korean Office Action mailed Nov. 21, 2008 for corresponding Korean Application 10-2007-7008503 filed on Sep. 13, 2005, 11 pgs.

U.S. Appl. No. 11/218,904, Official Communication mailed Dec. 16, 2008, 27 pgs.

International Search Report and Written Opinion for International Patent Application No. PCT/US05/31143, Aug. 5, 2008, 7 pages.

U.S. Appl. No. 11/154,122, Official Communication mailed Sep. 30, 2008.

U.S. Appl. No. 11/057,075, Official Communication mailed Dec. 4, 2008, 16 pgs.

European Supplementary Search Report for Application No. EP 05 79 6512, completed Apr. 23, 2009, mailed May 4, 2009.

Korean Office Action mailed Apr. 21, 2009 for corresponding Korean Application 10-2007-7008503 filed on Sep. 13, 2005.

Rees, Michael J., "User Interfaces for Lightweight In-line Editing of Web Pages," IEEE, 1999, pp. 88-94.

U.S. Appl. No. 11/220,002, Official Communication mailed on Jul. 15, 2009, 25 pages.

U.S. Appl. No. 11/012,543, Official Communication mailed on Aug. 6, 2009, 12 pages.

Shneiderman, Ben, "Dynamic Queries For Visual Information Seeking," IEEE Software, Nov. 1994, pp. 70-77.

U.S. Appl. No. 11/218,904, Official Communication mailed Aug. 14, 2009, 21 pages.

International Search Authority, International Search Report and Written Opinion mailed Feb. 14, 2006 in PCT/US05/32417, 9 pgs.
Japanese Office Action for Application No. JP 2007-532392, mailed Sep. 28, 2009.
Non-Final Office Action mailed Nov. 20, 2009 in U.S. Appl. No. 11/154,122.
U.S. Appl. No. 11/012,543, Official Communication mailed Dec. 17, 2008.
U.S. Appl. No. 11/012,543, Official Communication mailed Dec. 31, 2007.
U.S. Appl. No. 11/057,075, Official Communication mailed Aug. 18, 2009.
U.S. Appl. No. 11/057,075, Official Communication mailed Oct. 30, 2009.
U.S. Appl. No. 11/154,122, Official Communication mailed Apr. 28, 2009.
U.S. Appl. No. 11/218,904, Official Communication mailed Dec. 27, 2007.
U.S. Appl. No. 11/218,904, Official Communication mailed Jul. 11, 2008.
U.S. Appl. No. 11/220,002, Official Communication mailed Feb. 5, 2009.
U.S. Appl. No. 11/220,002, Official Communication mailed Oct. 25, 2007.
US Patent & Trademark Office, Office communication mailed Jan. 5, 2010 in U.S. Appl. No. 11/220,002, 25 pgs.
US Patent & Trademark Office, Office communication mailed Dec. 18, 2009 in U.S. Appl. No. 11/012,543, 12 pgs.
US Patent & Trademark Office, Office communication mailed Dec. 24, 2009 in U.S. Appl. No. 11/057,075, 20 pgs.
US Patent & Trademark Office, Office communication mailed Dec. 28, 2009 in U.S. Appl. No. 11/218,904, 20 pgs.
Document Classification, Wikipedia, http://en.wikipedia.org/wiki/text_categorization, Dec. 27, 2004, (Accessed Jan. 11, 2011).
Automatic Summarization, Wikipedia, http://en.wikipedia.org/wiki/automatic_summarization, May 5, 2004, (Accessed Jan. 11, 2010).
Languageware, Wikipedia, http://en.wikipedia.org/wiki/languageware, Oct. 18, 2007, (Accessed Jan. 11, 2010).
Linear Regression, Wikipedia, http://en.wikipedia.org/wiki/linear_regression, Mar. 18, 2001, (Accessed Jan. 11, 2010).
Doyle, M.E. and Smith, M.K., "Friendship: Theory and Experience," The Encyclopaedia of Informal Education, 2002 (best available date), http://www.infed.org/biblio/friendship.htm, (Accessed Jan. 11, 2010).
Hartup, W. W., "Having Friends, Making Friends, and Keeping Friends: Relationships as Educational Contexts," ERIC Digest, http://ceep.crc.uiuc.edu/pubs/ivpaguide/appendix/hartup-friends.pdf, 1992 (best available date).
Marmaros, D. and Sacerdote, B., "How Do Friendships Form'?," American Economic Associate, Dec. 23, 2004, http://www.aeaweb.org/annual_mtg_papers/2005/0107_1430_1103.pdf, (Accessed Jan. 10, 2010).
Helm, B., "Friendship," Stanford Encyclopedia of Philosophy, May 17, 2005, http://plato.stanford.edu/entries/friendship, (Accessed Jan. 11, 2010).

* cited by examiner

SYSTEM AND METHOD OF ADAPTIVE PERSONALIZATION OF SEARCH RESULTS FOR ONLINE DATING SERVICES

CROSS-REFERENCE TO RELATED APPLICATIONS

This application claims the benefit of U.S. Provisional Application Ser. No. 60/610,125 filed on Sep. 15, 2004, the benefit of the earlier filing date of which is hereby claimed under 35 U.S.C. §119 (e) and further incorporated by reference.

FIELD OF THE INVENTION

The present invention relates generally to online dating services, and more particularly, but not exclusively, to a system and method for automatically modifying search criteria, based, at least in part, on adaptive personalizations of search results.

BACKGROUND OF THE INVENTION

Dating services are now so popular that by at least one study for the given year, over twenty-six percent of all Internet users in the United States have visited a personals website. Part of the reason may be that online dating may appear to be a natural extension of where people are at this point in time. That is, many people today, have personal computers, or at least access to a personal computer. Moreover, virtually everyone wants to fall in love. Thus, it is natural to merge these two things. As such, online dating services may appear as the world's biggest singles bar. Except that it can be done in the privacy of one's own home where time may be taken to read about another person and get to know them through email, phone, and the like, before ever going on an actual date.

Thus, there has been a flurry of companies launching services that help people to meet and develop a personal relationship. Many of these companies, however, are struggling with developing additional services that will build customer loyalty. Without the ability to extend the value of the online dating experience, online dating may lose its appeal. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
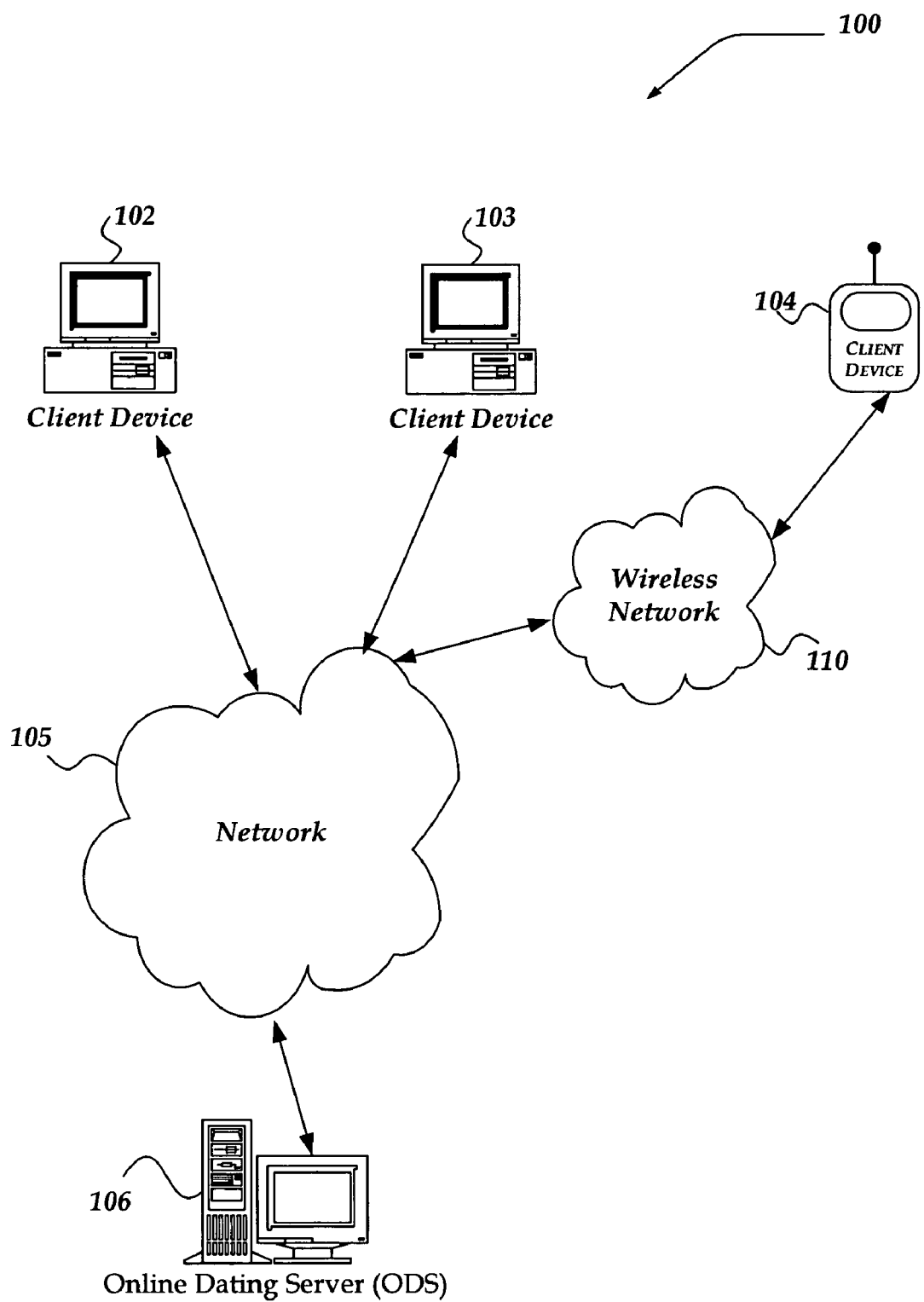
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the present invention is directed towards automatically modifying an online dating service's search results based, at least in part, on adaptive personalizations. A user may provide information about him/her self by answering a series of questions, including questions about their personality and relationship compatibilities, and optionally other social aspects associated with the user. The invention employs the information to identify a potential candidate list for a long-term social relationship with the user. The invention then determines a plurality of unified search score (USS) subscores for each candidate profile in the candidate list. The subscores may include a personality compatibility subscore between the user's and a candidate's profile, a relationship style compatibility subscore, a degree to which the candidate fulfills the user's stipulated search criteria, a degree to which the user's profile attributes fulfill the search criteria of the candidate's profile, how recently the candidate has visited the online dating service, a geographical distance between the candidate and the user as determined by location data within their respective profiles, a degree to which a candidate's profile is similar to another candidate's profile in which the user has indicated an interested, or the like. In addition, the user's activity history, affinity data, and feedback ratings may be employed to adaptively personalize the search results. For example, the user's activities of replying to a candidate, saving a candidate's profile, viewing a candidate's profile, and the like, may adaptively and automatically adjust a weighting of a candidate's USS, and thereby potentially move the candidate up or down in a rank ordered candidate list. By personalizing the search results the invention is enabled to provide a balanced presentation of search results that adaptively tailor the ranking of candidates based on the individual user's dynamic preferences.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, wireless network 110, and online dating server (ODS) 106. Network 105 is in communication with and enables communication between each of client devices 102-103 and ODS 106. Wireless network 110 is in communication with network 105 and enables communication between client device 104 and, by way of network 105, client devices 102-103 and ODS 106

Generally, client devices 102-104 may include virtually any computing device capable of receiving and sending a message over a network, such as network 105, wireless network 110, or the like, to and from another computing device, such as ODS 106, each other, or the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 102-104 also may be any computing device that is capable of connecting using a wired or wireless communication medium such as a PDA, POCKET PC, laptop computer, wearable computer, mobile phone and any other device that is equipped to communicate over a wired and/or wireless communication medium.

Client devices 102-104 may include a browser application that is configured to receive and to send web pages, web-based messages, and the like. The browser application may be configured to receive and display graphics, text, multimedia, and the like, employing virtually any web based language, including Standard Generalized Markup Language (SMGL), HyperText Markup Language (HTML), eXtensible Markup Language (XML), and so forth.

Client devices 102-104 may further include a client application that enables it to perform a variety of other actions, including, communicating a message, such as through a Short Message Service (SMS), Multimedia Message Service (MMS), instant messaging (IM), internet relay chat (IRC), Mardam-Bey's IRC (mIRC), Jabber, and the like, between itself and another computing device. The browser application, and/or another application, such as the client application, a plug-in application, and the like, may enable client devices 102-104 to communicate content to another computing device.

Client device 104 represents one embodiment of a computing device that is configured to be portable. Thus, client device 104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client device 104 typically ranges widely in terms of capabilities and features. For example, a cell phone may have a numeric keypad and a few lines of monochrome LCD display on which only text may be displayed. In another example, a web-enabled remote device may have a touch sensitive screen, a stylus, and several lines of color LCD display in which both text and graphics may be displayed. Moreover, the web-enabled remote device may include a browser application enabled to receive and to send wireless application protocol messages (WAP), and the like. In one embodiment, the browser application is enabled to employ a Handheld Device Markup Language (HDML), Wireless Markup Language (WML), WMLScript, JavaScript, XML, and the like, to display and send a message.

Client device 104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, client device 104 may uniquely identify itself through any of a variety of mechanisms, including a phone number, Mobile Identification Number (MIN), an electronic serial number (ESN), Mobile Subscriber Integrated Services Digital Network (MS-ISDN), or other mobile device identifier.

Client device 104 may also be configured to communicate a message, such as through a SMS, MMS, IM, IRC, mIRC, Jabber, and the like, between another computing device, such as ODS 106, or the like. However, the present invention is not limited to these message protocols, and virtually any other message protocol may be employed.

Client devices 102-104 may be further configured to enable a user to participate in an online dating service, manage personal user information associated with the online dating service, and the like, which may in turn be saved at a location, such as ODS 106, and the like. As such, client devices 102-104 may further include a client application that is configured to manage various actions on behalf of the client device. For example, the client application may enable a user to interact with the browser application, email application, and the like, to manage their online dating information. For example, the user may employ the client application, in part, to create a user profile, participate in an online dating personality analysis, such as a personality type and love styles test, a relationship test, and the like. The client application may further enable the user to receive and interact with results of a search that is based, at least in part, on the user's input to the online dating service. Moreover, the client application further enables the user to interact with the online dating service results of the search, and to provide actions that may then be used to automatically revise the search results. Such interactions may include skipping various candidate profiles, selecting for viewing a candidate's profile, saving a candidate's profile, or other personalized actions.

The client application also may interact with various other components of the system as described in more detail below. For example, in at least one embodiment, the client application is configured to enable the user to provide a fee for at least a portion of the online dating service.

Wireless network 110 is configured to couple client device 104 and its components with network 105. Wireless network 110 may include any of a variety of wireless sub-networks that may further overlay stand-alone ad-hoc networks, and the like, to provide an infrastructure-oriented connection for client device 104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 2.5G, 3rd (3G) generation radio access for cellular systems, WLAN, Wireless Router (WR) mesh, and the like. Access technologies such as 2G, 2.5G, 3G, and future access networks may enable wide area coverage for mobile devices, such as client device 104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client device 104 and another computing device, network, and the like.

Network 105 is configured to couple ODS 106 and its components with other computing devices, including, client devices 102-103, and through wireless network 110, client device 104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of ODS 106 is described in more detail below in conjunction with FIG. 2. Briefly, however, ODS 106 may include any computing device capable of connecting to network 105 to enable a user of at least one of client devices 102-104 to manage their online dating activities and related information. Devices that may operate as ODS 106 include personal computers desktop computers, multiprocessor systems, microprocessor-based or programmable consumer electronics, network PCs, servers, and the like.

It is noted that while FIG. 1 illustrates a single computing device operable as ODS 106, the invention is not so limited. For example, the actions attributable to ODS 106 may be distributed across multiple computing devices, such as a group of servers, a network cluster, and the like, without departing from the scope or spirit of the invention.

Illustrative Server Environment

Figure 2:
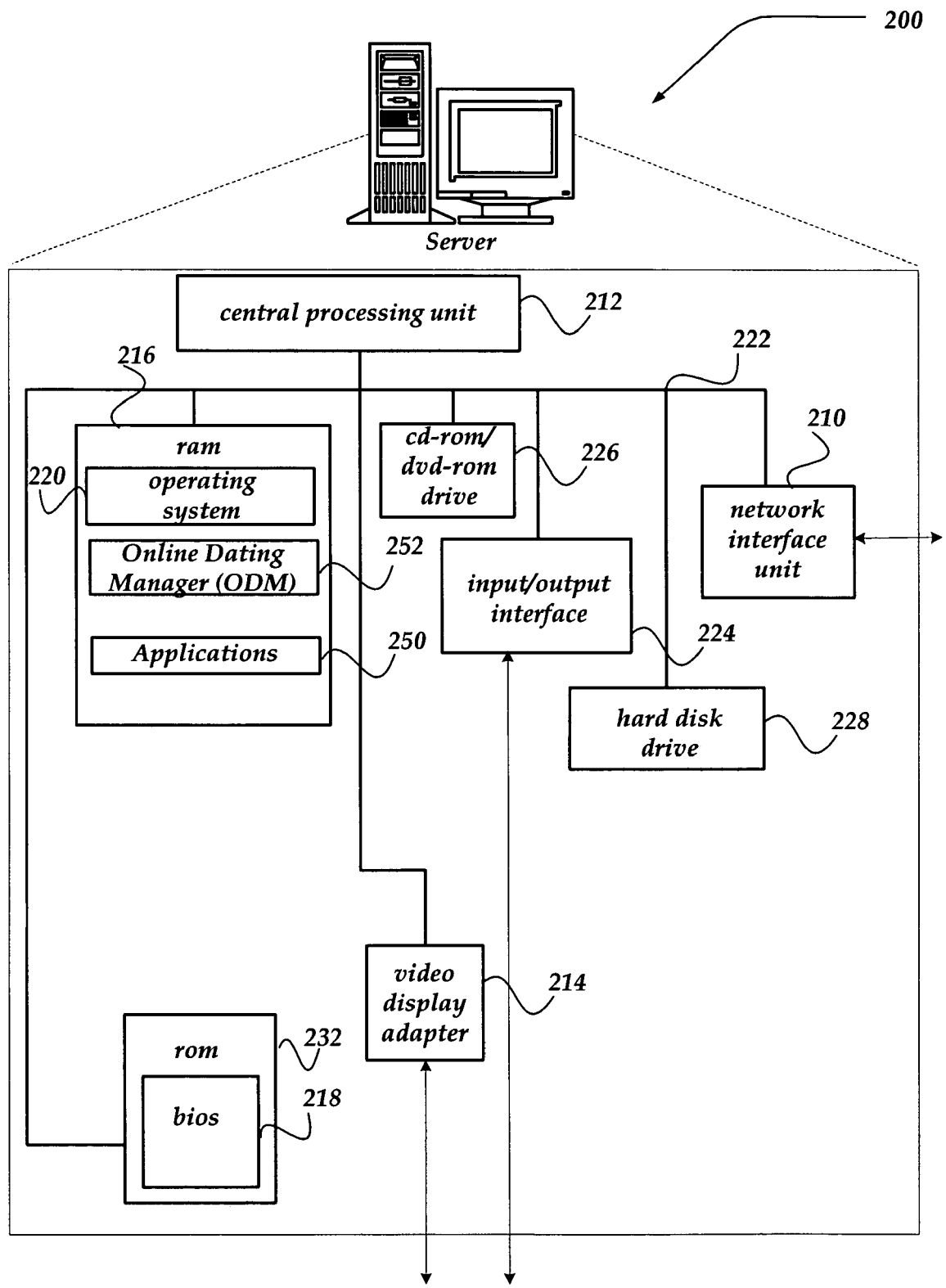
FIG. 2 shows one embodiment of a server device that may be included in a system implementing the invention.

FIG. 2 shows one embodiment of a server device, according to one embodiment of the invention. Server device 200 may include many more components than those shown. The components shown, however, are sufficient to disclose an illustrative embodiment for practicing the invention. Server device 200 may be employed as one embodiment of ODS 106 of FIG. 1.

Server device 200 includes processing unit 212, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server 102. As illustrated in FIG. 2, server device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

Server device 200 may also include an SMTP handler application for transmitting and receiving email. Server device 200 may also include an HTTP handler application for receiving and handing HTTP requests, and an HTTPS handler application for handling secure connections. The HTTPS handler application may initiate communication with an external application in a secure fashion.

Server device 200 also includes input/output interface 224 for communicating with external devices, such as a mouse, keyboard, scanner, or other input devices not shown in FIG. 2. Likewise, server device 200 may further include additional mass storage facilities such as hard disk drive 228. Hard disk drive 228 is utilized by server 102 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Mass storage may further include applications such as online dating manager (ODM) 252.

ODM 252 enables a user to manage their online dating user information, communicate with other users, and non-users, and to generally pursue an online dating relationship. ODM 252 provides a variety of features to enable a user of a client device to participate in the online dating experience. In one embodiment, ODM 252 is configured to automatically modify, for example, an online dating service's search results based on adaptive personalization inputs.

For example, ODM 252 may enable a user to provide information about him/her self by answering a series of questions, including questions about their personality and relationship compatibilities, and optionally other social aspects associated with the user. In one embodiment, ODM 252 may enable the user to take various tests. The results of these tests may be employed in the search for candidates of a potentially long term relationship with the user. For example, ODM 252 may allow the user to participate in a personality type and love style test or in a relationship test. However, the invention is not so limited, and other tests may be employed without departing from the scope or spirit of the invention.

In addition, ODM 252 may employ additional information about the user, user's activities, relationships, or the like, to perform the search for candidates of a potentially long term relationship with the user.

The results of the tests, as well as other inputs, may be employed to determine a unified search score (USS) sub-scores for each candidate profile in a possible search result set. The subscores may include a personality compatibility subscore between the user's and a candidate's profile, a relationship style compatibility subscore, a degree to which the candidate fulfills the user's stipulated search criteria, a degree to which the user's profile attributes fulfill the search criteria of the candidate's profile, how recently the candidate has visited the online dating service, a geographical distance between the candidate and the user as determined by location data within their respective profiles, a degree to which a candidate's profile is similar to another candidate's profile in which the user has indicated an interested, or the like.

ODM 252 may also employ a variety of mechanisms to enable the user to rate the candidates and thereby provide feedback on a compatibility of a potential candidate. For example, ODM 252 may enable the user to select a rating designation from an n-pointed value, employ a slider bar for evaluating the candidate, a button, drop-down menu, and the like. In one embodiment, the user may provide a global value as their compatibility feedback for the candidate. In another embodiment, the user may provide multiple values as their compatibility feedback for various aspects of the candidate. In one embodiment ODM 252 may employ compatibility feedback where a sufficient quantity of compatibility feedback has been provided by the user. A sufficient quantity may be based on any of a variety of criteria, including whether the user has rated a predetermined number of candidates, whether the user has provided compatibility feedback for at least a first predetermined number of candidates on a candidate list, or virtually any other criteria. Taking into account the various actions of the user enables the invention to dynamically adapt and personalize the search results to the user.

Figure 3:
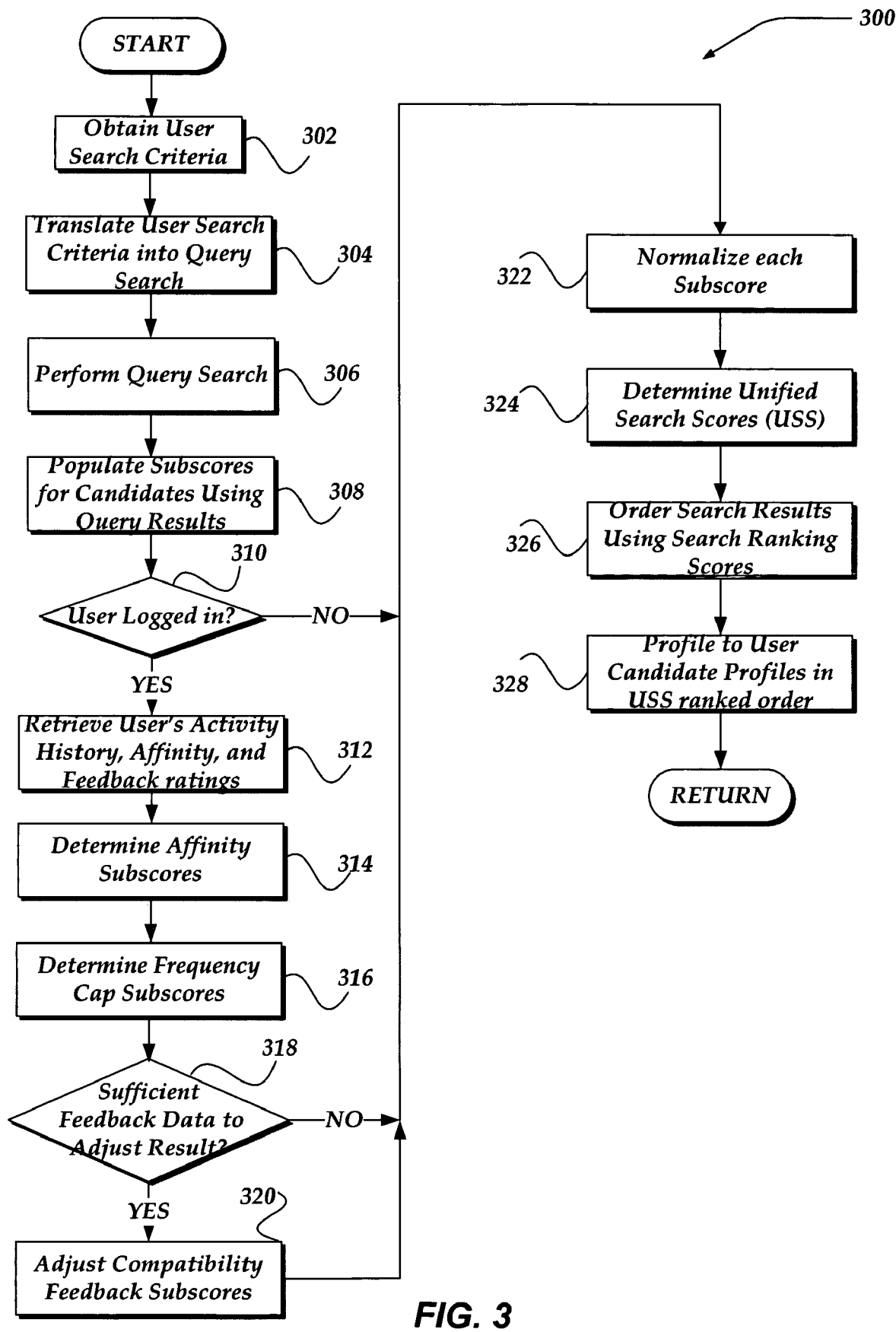
FIG. 3 illustrates a logical flow diagram generally showing one embodiment of a process for adaptive personalizations of an online dating search, in accordance with the present invention.

ODM 252 may employ a process, such as process 300 described below in conjunction with FIG. 3 to perform actions, such as those described above.

Furthermore, ODM 252's associated actions and/or sub-components may be decomposed and distributed across multiple computing devices similar to server device 200 of FIG. 2. For example, actions associated with determining USS subscores may be distributed across one set of servers, while searches may be performed employing a sub-component of ODM 252 distributed across another set of servers. A search data store sub-component of ODM 252 may also be distributed across one or more computing devices. In addition, a user interface sub-component of ODM 252 may be distributed across still another server, array of servers, and the like.

Generalized Operation

The operation of certain aspects of the invention will now be described with respect to FIG. 3. FIG. 3 illustrates a logical flow diagram generally showing one embodiment of a process for adaptive personalizations of an online dating search, in accordance with the present invention. As illustrated, the adaptive personalizations employ the USS to rank order a list of candidates.

As shown in the figure, process 300 typically begins, after a start block, at block 302, when a user indicates intent to participate in a long-term serious relationship and is willing to openly communicate this desire to others. At block 302, the user's search criteria may be obtained from information that the user has already provided or currently enters. In one embodiment, the user provides the information using an online search form, or the like. The user may, for example, have provided basic information, including such a name, alias, age, gender, and so forth. In one embodiment, the user may have provided information through a test. In one embodiment, the test is a personality type and love style test that focuses on such personality elements as degree of extroversion, agreeableness, conscientiousness, neuroticism, openness, and so forth. However, the test is not so constrained, and virtually any test, series of questions, and the like, may be employed to enable the invention to obtain compatibility information about the user. In one embodiment, the user may also provided input to additional testing that may be directed towards personality elements such as relationship readiness, relationship expectations, ambition, a desire to have children, emotional IQ, stereotypic gender roles, conflict resolution, and so forth. However, the invention is not constrained to these example elements, and others may be tested, without departing from the scope or spirit of the invention.

The tests may employ any of a variety of techniques to obtain such personality elements, including, providing questions, surveys, graphics, interactive audio clips, interactive video clips, and the like. In one embodiment, the results of the initial test may be provided to the user for review and/or refinement. The results may be presented to the user in a variety of formats, including a written summary that is organized based on personality, love style, and the like.

During block 302 or prior to entry of process 300, the user may specify (or may have specified) demographic criteria of the prospective partner(s) whom they wish to find in the search. In one embodiment, these criteria may include attributes such as age, height, gender, religion, ethnicity, degree of educational attainment, profession, vocational interests, and so forth. However the invention is not constrained to these example elements, and others may be included, without departing from the scope or spirit of the invention. In one embodiment, the demographic criteria may be designated as must-have, nice-to-have, and the like. As such, the must-have criteria may, for example, identify criteria that, if unmet, might exclude a candidate from a candidate pool.

The result of providing information is that personalized search criteria may be established for the user. In one embodiment, the personalized search criteria are in a form of requirements and/or preferences that the user has intended to have satisfied, at least in part.

Proceeding to block 304, the personalized search criteria may be translated into a database personalized search query. In one embodiment, the database query employs a Structured Query Language (SQL) format. However, the invention is not so limited and virtually any query format may be employed that is suitable for submission to a database. The query is typically designed to return relatively rudimentary information about various profiles associated with candidates in the database that may fulfill the user's personalized search criteria. Process 300 continues to block 306, where the personalized search query is submitted to one or more databases that are configured to include profiles of candidates. At block 306, it is anticipated that at least one profile is returned based on the submitted query. Moreover, in one embodiment, the results include at least those candidates that satisfy the must-have criteria.

Continuing next to block 308, one or more USS subscores, $I_i$, are created for each of the returned candidate profiles. The USS subscores may initially be set to a default value, such as zero, or the like. Such USS subscores are directed at reflecting various personalized elements of the user, including: a personality compatibility score between the user and a candidate profile, such as where the owner of the candidate profile and the owner have taken a personality test; relationship style compatibility score, such as where the owner of the candidate profile and the owner have taken a relationship test; a degree to which the candidate profile fulfills the user's stipulated search criteria (a one-way search subscore); a degree to which the user's profile attributes fulfill the search criteria associated with an owner of the candidate profile (a reverse search subscore); how recently an owner of the candidate profile has visited the online dating service (activity level); a geographical distance between an owner of the candidate profile and the user as determined by location data in the respective profiles; or the like.

It is noted that these are merely examples, of a variety of possible personalized elements may be used to develop USS subscores, and is in no manner intended to be exhaustive or limiting. Thus, virtually any other personalized elements may be employed to develop USS subscores, without departing from the scope or spirit of the invention.

Processing then proceeds to decision block 310, where a determination is made whether the user is currently logged into the online dating service as a member, or whether the user is merely viewing pages without being logged into the online data service. If the user is logged in, processing continues to block 312; otherwise, processing branches to block 322.

At block 312, the user's activity history, affinity information, profile data, and possible feedback ratings are retrieved from a history data store. Such information may include indications of the user's online activities including whether the user has provided or received communications with an owner of a profile, where a candidate has a degree of geographical proximity with another candidate found by the search results, whether the user has provided feedback about a candidate, a number of times the user has seen a candidate profile in prior search results or the like. The information may also include a degree to which a candidate profile is similar to others that the user has previously expressed an interest by virtue of any of a variety of actions, including replying to a candidate, saving a candidate profile, a number of time the user may have viewed details of a candidate profile, or the like. Processing continues to block 314 where the personalized elements may be employed to develop an affinity USS subscore.

Continuing next to block 316, where the user's search result history is reviewed to determine if the user has been presented a candidate profile more than some predetermined number of times without the user viewing the candidate profile in more detail. If such a candidate profile is identified in the current query search results, then a frequency cap USS subscore is generated that represents this information for the candidate profile.

Process 300 continues to decision block 320, where a determination is made whether a sufficient amount of compatibility feedback is available for the given user. A sufficient amount may be determined employing any of a variety of mechanisms, including engineering judgment, and the like. In one embodiment, a sufficient amount may be set to a predetermined number compatibility feedback inputs.

User compatibility feedback may be provided employing any of a variety of techniques. For example, the invention may automatically determine compatibility feedback based on whether the user has contacted a candidate in the current search results, based on a frequency of the user's contacts with a candidate, based on an order in which the user contacted candidates, and the like. The invention may also prompt the user to rate or evaluate candidates on a candidate list. For example, the user may be provided a slider bar, a drop-down menu, a button input, radio input, and the like, that allows the user to indicate an overall rating for a candidate. In one embodiment, the user may provide a rating of the candidate using a scale that includes, for example, an n-pointed range of discrete values, such as ±1.0, ±0.5, and 0. However, the invention is not so limited, and the user may also provide a fractional rating for the selected candidate. For example, the user may be provided a slider bar that enables rating of the candidate with an overall subjective compatibility value, such as "excellent," "good," "fair," and so forth. Thus, compatibility feedback may have been obtained through any of a variety of mechanisms. In any event, if a sufficient amount of compatibility feedback is available, processing flows to block 320. In an absence of a sufficient amount of compatibility feedback, the compatibility feedback USS subscore may be set to zero, prior to branching to block 322.

At block 320 the compatibility feedback is applied to the profiles for each candidate. In one embodiment, the compatibility feedback USS subscore may include an average compatibility feedback for a candidate's personality type.

Processing continues next to block 324, where each of the USS subscores is normalized based on a range of values seen for each USS subscore in the current search result. Processing flows next to block 326, where the USS is determined from a weighted sum of the normalized USS subscores as:

$$USS = \mathrm{Sum}(W_i I_i), \text{ for } i=1 \text{ through } n,$$

where $W_i$ represents a weighting for USS subscore, $I_i$, as described above. Weighting $W_i$ may be virtually any value, including negative values. For example, the weighting associated with frequency caps may be negative to decrease the likelihood that the user will view a candidate that they have not expressed an interest in. Moreover, the weighting, $W_i$, that is applied to each USS subscore may vary from user to user and may reflect the relative importance that the user assigns to each of the characteristics represented by the various USS subscores. By employing such user based weightings, the search results may be further personalized to the user. However, the weighting need not be entirely user adjustable, and at least one weighting, $W_i$, may be predetermined by the invention to place more emphasis on a USS subscore over another USS subscore.

Processing next flows to block 326, where the candidate profiles from the search query at block 306 are rank ordered based on their respective USS scores. Processing then flows to block 328, where the rank ordered candidate list is provided to the user. In one embodiment, the provided candidate list includes a predetermined number of candidates. For example, in one embodiment, the rank ordered candidate list may include a top most 1000 candidates. In another embodiment, the sorted candidate list is presented to the user in a navigable sequence of web pages. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in managing an online dating search with at least one network device including a processor that executes instructions for enabling actions, comprising:
    determining a user's search criteria for a candidate for a dating relationship online;
    performing a search for a list of candidates employing the search criteria;
    determining, using the processor, a unified search score for each candidate in the list of candidates, wherein the determined unified search score includes a summation of a plurality of sub-scores, and wherein at least one of the plurality of sub-scores is based on whether the user has been presented with a candidate's profile more than a pre-determined number of times without the user viewing details of the candidate's profile;
    rank ordering each candidate in the list of candidates based on the unified search score of each candidate; and
    displaying at least a portion of the rank ordered list of candidates on a computer screen.

2. The method of claim 1, wherein determining a unified search score for each candidate further comprises determining a plurality of subscores for each candidate based on adaptive personalizations of the user.

3. The method of claim 2, wherein the plurality of subscores represent at least one of a personality compatibility subscore, a relationship style compatibility subscore, a one-way search subscore, a reverse search subscore, an activity level, and a subscore indicating a geographical distance between a candidate in the list of candidates and the user.

4. The method of claim 1, wherein determining the unified search score for each candidate further comprises:
    determining a user activity subscore based on an order in which the user has contacted at least two candidates; and
    including within the unified search score a numeric value associated with the determined user activity subscore.

5. A client device that is configured for use in managing an online dating search, comprising:
    a display;
    a transceiver for receiving and sending information to another computing device;
    a processor in communication with the display and the transceiver that includes instructions that cause the processor to perform a plurality of operations, including:
        sending a user's search criteria for a candidate for a dating relationship online;
        requesting a search for a list of candidates employing the search criteria;
        displaying at least a portion of a rank ordering of the list of candidates, wherein the rank ordering is determined by:
            determining a plurality of subscores for each candidate that, in part, are based at least on whether the user has been presented with a candidate's profile more than a pre-determined number of times without the user viewing details of the candidate's profile;
            determining a unified search score for each candidate from the each candidate's plurality of sub-scores; and
            rank ordering the candidates in the list based on each candidate's unified search score.

6. The client device of claim 5, wherein the client device is a mobile device.

7. The client device of claim 5, wherein determining the unified search score for each candidate further comprises determining the unified search score for each candidate, in part, by combining weighted normalized subscores for each candidate.

8. The client device of claim 7, wherein the rank ordering is further determined by:
    receiving an update to at least one of the plurality of weights; and
    dynamically updating the rank ordering of each candidate in the same list of candidates based on the updated weights.

9. The client device of claim 5, wherein determining a plurality of sub-scores for each candidate further comprises determining a subscore for at least one of a one-way search criteria sub-score, a reverse search criteria subscore, a distance subscore, a number of times the user has viewed a candidate's profile, and a number of replies a candidate has received within a predetermined time.

10. The client device of claim 5, wherein at least one of the plurality of subscores is based on a user rating provided with at least one of a slider bar, a button, and a drop-down menu, to rate the candidate.

11. A server device that is configured for use in managing an online dating search, comprising:
    a transceiver for receiving and sending information to another computing device;
    a processor in communication with the transceiver; and
    a memory in communication with the processor for storing data and machine instructions that cause the processor to perform a plurality of operations, including:
        obtaining a user's search criteria for a candidate for a dating relationship online;
        performing a search for a list of candidates employing the search criteria;
        determining a unified search score for each candidate in the list of candidates, wherein the determined unified search score includes a summation of a plurality sub-scores, and wherein at least one of the plurality of sub-scores is based on whether the user has been presented with a candidate's profile more than a pre-determined number of times without the user viewing details of the candidate's profile;

rank ordering each candidate in the list of candidates based on the unified search score of each candidate; and providing at least a portion of the rank ordered list of candidates to the other computing device.

12. The server device of claim 11, wherein the other computing device is a mobile device employable by the user to communicate with the server.

13. The server device of claim 11, wherein determining the unified search score further comprises combining a weighted subscore associated with a compatibility feedback about a candidate in the list of candidates with a weighted subscore associated with at least one of a user activity or affinity indicator associated with the candidate.

14. The server device of claim 11, wherein determining the unified search score further comprises:

determining a plurality of subscores based on at least one of an initial user test score, an additional user test score, a one-way search criteria score, a reverse search criteria subscore, an activity score, a distance score, an score reflecting a number of times the user has viewed a candidate's profile, a score reflecting a number of replies a candidate has received, or an affinity score;

normalizing each of the plurality of subscores; and combining the plurality of subscores, wherein each of the plurality of subscores are weighted prior to combining them.

15. The server device of claim 11, wherein the unified search score further comprises a combination of a plurality of adaptive personalization subscores.

16. A computer readable storage medium for managing an online dating search over a network, the computer readable storage medium comprising instructions that when executed enable a computing device to perform the actions of:

receiving a user's search criteria for a candidate for a dating relationship online;

performing a search for a list of candidates employing the search criteria;

determining a unified search score for each candidate in the list of candidates based on adaptive personalizations of the user, wherein at least one of the adaptive personalizations is based on whether the user has been presented with a candidate's profile more than a pre-determined number of times without the user viewing details of the candidate's profile;

rank ordering each candidate in the list of candidates based on the unified search score of each candidate; and providing to another computing device at least a portion of the rank ordered list of candidates.

17. The computer readable storage medium of claim 16, wherein the other computing device is a mobile device.

18. The computer readable storage medium of claim 16, wherein at least one adaptive personalization is associated with a compatibility feedback associated with at least one candidate in the list of candidates.

19. The computer readable storage medium of claim 16, wherein the adaptive personalizations further comprises a plurality of values associated with at least one of a user's activity history, affinity information, a user profile, or a feedback rating.

20. The computer readable storage medium of claim 16, wherein the adaptive personalizations further comprise a plurality of values indicating at least one of whether the user has provided or received communications with a candidate, whether a candidate has a degree of closeness with another candidate in the list of candidates, whether the user has provided feedback on a candidate, a number of times the user has seen a candidate profile in a prior candidate list, or a degree to which a candidate is similar to another candidate.

21. An apparatus of managing an online dating search, comprising:

a transceiver for receiving and sending information to another computing device;

means for determining a user's search criteria for a candidate for a dating relationship online;

means for determining a list of candidates based, at least in part, on the search criteria;

means for determining user personalizations for each candidate in the list of candidates, wherein at least one of the personalizations is based on whether the user has been presented with a candidate's profile more than a pre-determined number of times without the user viewing details of the candidate's profile;

means for employing at least some of the user personalizations to rank order each candidate in the list of candidates; and means for providing at least a portion of the rank ordered list of candidates towards the other computing device.

22. A method for use in managing an online dating search with at least one network device including a processor that executes instructions for enabling actions, comprising:

determining a user's search criteria for a candidate for a dating relationship online;

performing a search for a list of candidates employing the search criteria;

determining, using the processor, a unified search score for each candidate in the list of candidates based at least on a degree to which the candidate profile is similar to another candidate profile the user has previously expressed interest in, wherein the determined unified search score includes a summation of a plurality of weights for at least one sub-score, wherein the plurality of weights includes at least one of a predetermined weight, an adaptive weight, or a user defined weight, wherein determining the unified search score for each candidate further comprises determining a user activity subscore based on an order in which the user has contacted at least two candidates, and wherein a numeric value associated with the determined user activity subscore is included within the unified search score and wherein at least one of the plurality of subscores is based on whether the user has been presented with a candidate's profile more than a pre-determined number of times without the user viewing details of the candidate's profile;

adjusting the determined unified search score such that the adjusting compensates for a similar rating for a portion of the candidates in the list previously provided by the user when a size of that portion of candidates in the list is at least a predetermined amount of the plurality of candidates;

rank ordering each candidate in the list of candidates based on the unified search score of each candidate; and displaying at least a portion of the rank ordered list of candidates on a computer screen.

* * * * *

UNITED STATES PATENT AND TRADEMARK OFFICE
CERTIFICATE OF CORRECTION

| | | |
|---|---|---|
| PATENT NO. | : 7,882,039 B2 | |
| APPLICATION NO. | : 11/191389 | |
| DATED | : February 1, 2011 | |
| INVENTOR(S) | : Aaron F. Weiss et al. | |

It is certified that error appears in the above-identified patent and that said Letters Patent is hereby corrected as shown below:

On the Face Page, in field (75), in Inventors, in column 1, line 1, delete "Sunnyval," and insert -- Sunnyvale, --, therefor.

Signed and Sealed this
Nineteenth Day of April, 2011

David J. Kappos
*Director of the United States Patent and Trademark Office*